US006290162B1

(12) United States Patent
Sano et al.

(10) Patent No.: US 6,290,162 B1
(45) Date of Patent: Sep. 18, 2001

(54) APPARATUS AND METHOD FOR MANUFACTURING GOLF BALL

(75) Inventors: Hideki Sano; Takayuki Saimen, both of Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/484,542

(22) Filed: Jan. 18, 2000

(30) Foreign Application Priority Data

| Feb. 1, 1999 | (JP) | 11-023393 |
| Feb. 1, 1999 | (JP) | 11-024198 |
| Feb. 4, 1999 | (JP) | 11-027243 |

(51) Int. Cl.⁷ ............................................. B65H 54/64
(52) U.S. Cl. ............................................. 242/435.2
(58) Field of Search .................. 242/435, 435.1, 242/435.2, 443, 443.1, 444, 445.1

(56) References Cited

U.S. PATENT DOCUMENTS

| 1,974,508 | * | 9/1934 | Pym | 242/435.1 |
| 2,161,546 | * | 6/1939 | Honig | 242/435.1 |
| 2,171,607 | * | 9/1939 | Sibley | 242/435.1 |
| 2,193,044 | * | 3/1940 | Sibley | 242/435.1 |
| 2,260,921 | * | 10/1941 | Sibley | 242/435.1 |
| 4,846,910 | * | 7/1989 | Brown | 242/435.1 |
| 5,133,509 | * | 7/1992 | Brown | 242/435.1 |
| 5,626,308 | * | 5/1997 | Fukazawa | 242/435.2 |
| 5,630,562 | * | 5/1997 | Fukazawa | 242/435.2 |

FOREIGN PATENT DOCUMENTS

| 360015364 | * | 1/1985 | (JP) | 242/435.2 |
| B25-10959 | | 2/1993 | (JP) . | |

* cited by examiner

Primary Examiner—Emmanuel M. Marcelo
(74) Attorney, Agent, or Firm—Birch, Stewart, Kolasch & Birch, LLP

(57) ABSTRACT

An apparatus for winding a string, made of rubber, on a core to form a wound string core. The apparatus is provided with plurality of string winding device, each of which is for winding a string on a core, a treatment device of string starting end which winds to fix a starting end of the string to the core, a treatment device of wound string end which fastens an end of the wound string core at the end of the winding process, and a core providing device for providing the core to the treatment device of string starting end.

10 Claims, 17 Drawing Sheets

# APPARATUS AND METHOD FOR MANUFACTURING GOLF BALL

BACKGROUND OF THE INVENTION

1. Field of the Invention

This invention relates to a golf ball apparatus and method for obtaining a wound string core by winding a string, made of rubber, on a core.

2. Description of the Related Art

A golf ball which comprises a wound string core is conventionally manufactured by the method below. A string, made of rubber, is wound on a core to form a wound string core, and the core is covered to form the golf ball. The core to be string wound is made of a solid rubber or formed by filling liquid or paste material into a rubber bag.

A method described below for winding a string, made of rubber, on a core or a center is widely adapted. First, the core is held by string winding rollers, and at least one of the rollers is driven to rotate, thus the core is being rotated while providing the string to a surface of the core, thereby the string is wound on the core.

At the start of string winding, the starting end of the string is needed to be fixed to the core, and at the end of the winding process, the wound end of the string is needed to be fastened. A string winding apparatus for automatically treating the string starting end and the wound string end is disclosed in Japanese Patent Publication No.5-10959.

This conventional string winding apparatus comprises winding devices which are provided in a circle, and an arm for treating the string starting end and the wound string end provided on a movable table located in an inner area of the circle of the winding devices. The arm is arranged to face each of the winding devices and treat the string starting end and the wound string end in respect of each device sequentially.

In the conventional string winding apparatus, the construction of the arm is complicated and movements of the devices are also complicated, and therefore the speeding up of the device movement is limited. Furthermore the one arm operates both treatments of the string starting end and the wound string end in respect of each device, and the time required to finish the treatments in respect of each device takes long and the operation efficiency is lowered. Moreover, a freezing means to keep cores (liquid centers) frozen is provided to each winding device, and as a result, the whole apparatus is a large-sized apparatus.

It is therefore an object of the present invention to provide an apparatus and method for manufacturing a golf ball wherein a construction is simplified and operation efficiency is increased.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
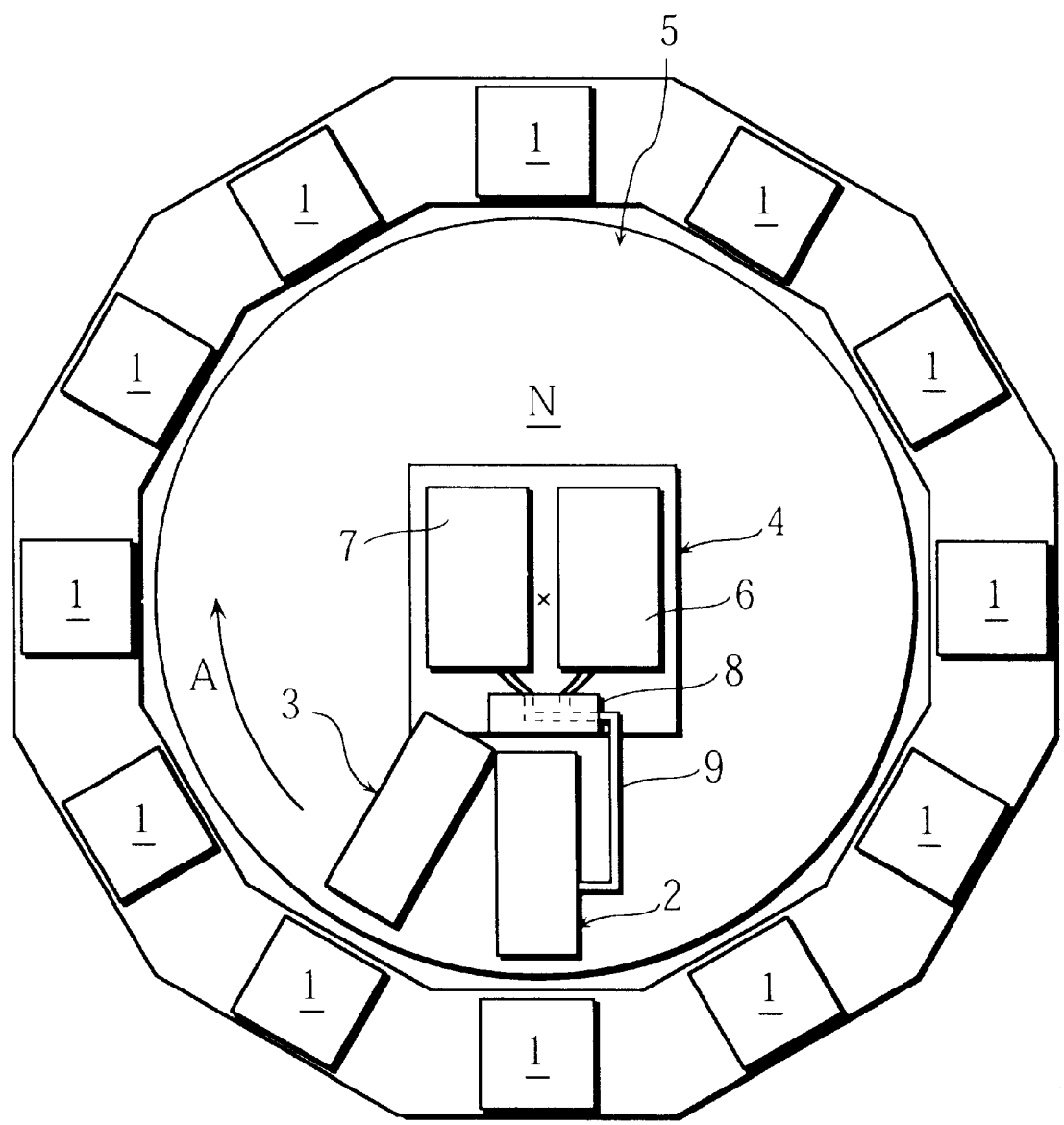
FIG. 1 is a configuration explanatory view showing an embodiment of an apparatus for manufacturing a golf ball according to the present invention.

FIG. 1 is a top view for explanation of a configuration of an apparatus for manufacturing a golf ball according to the present invention. The apparatus is for winding a string, made of rubber, on a core to form a wound string core. The apparatus is provided with a plurality of string winding means 1 each of which is for winding a string on a core, a treatment means 2 of string starting end which winds to fix a starting end of the string to the core, a treatment means 3 of wound string end which fastens an end of the wound string core at the end of the winding process, and a core providing means 4 for providing the core to the treatment means 2.

The core to be string-wound mentioned above includes a core formed by filling liquid or paste material into a bag made of rubber, that is a liquid center, or a core made of a solid rubber, that is a solid center.

Figure 2:
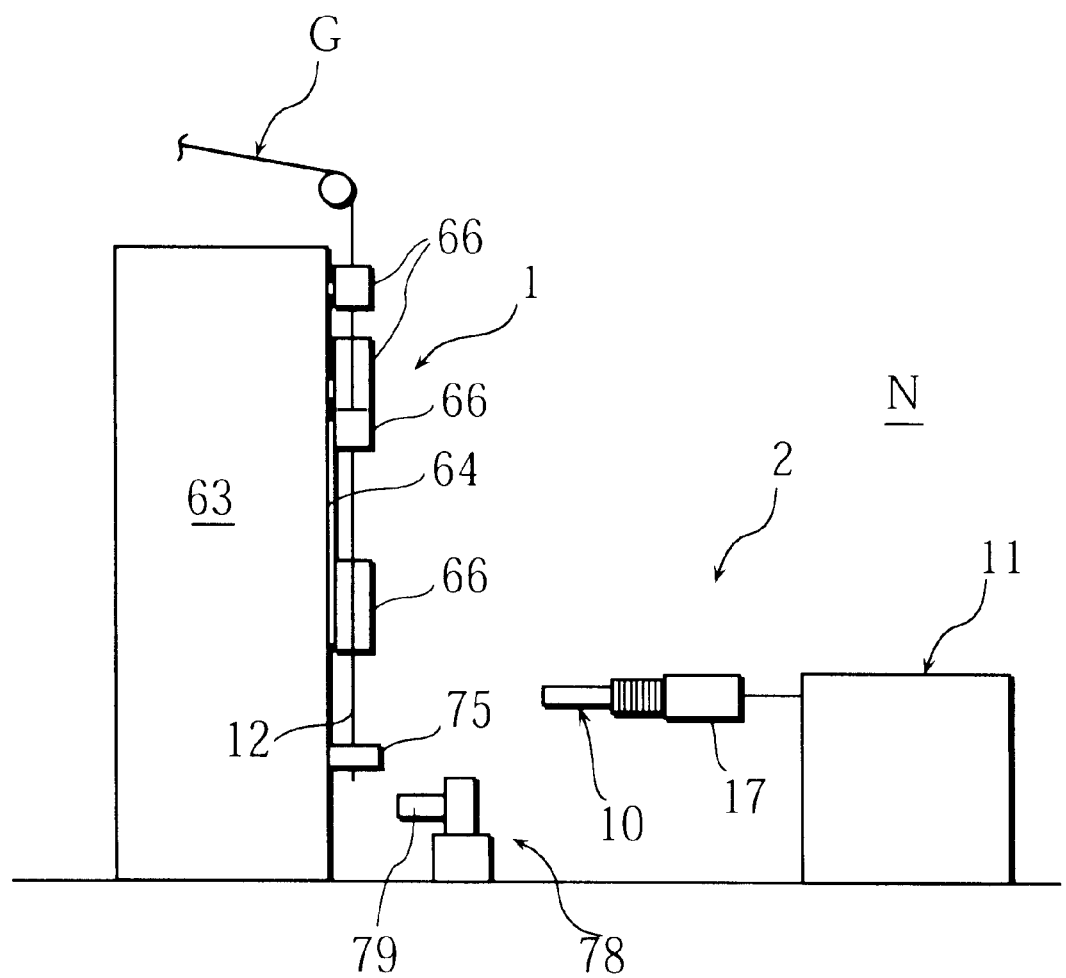
FIG. 2 is a schematic explanatory view showing one of the string winding means and a treatment means of string starting end.
Figure 4:
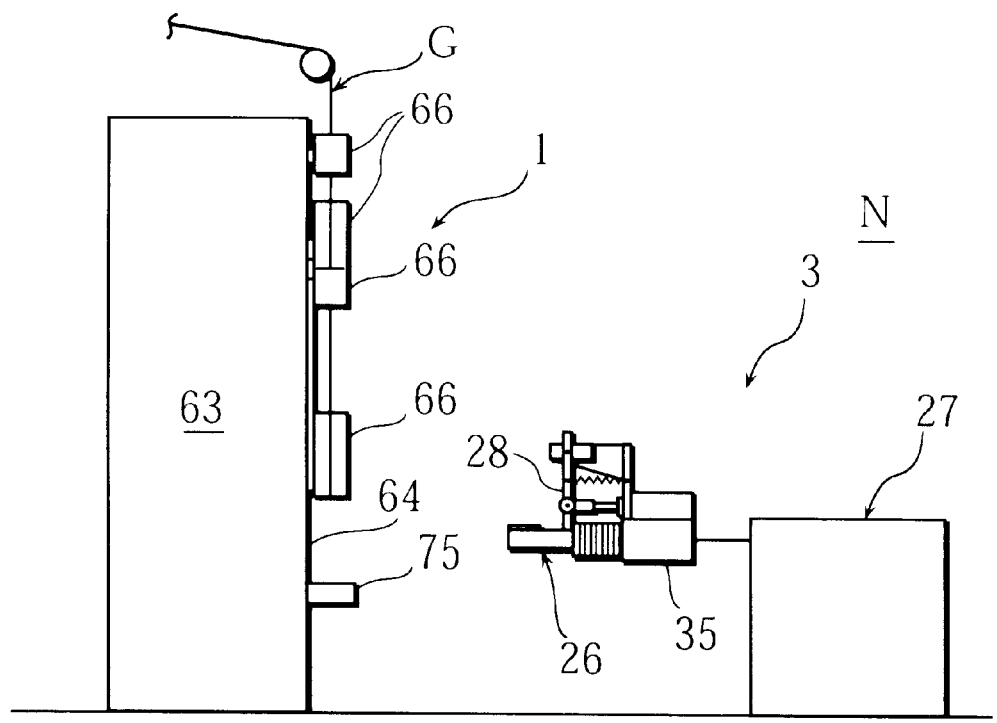
FIG. 4 is a schematic explanatory view showing one of the string winding means and a treatment means of wound string end.

As shown in FIGS. 1, 2 and 4, a plurality of string winding means (devices) 1 are provided in a circle at regular intervals. In an inner area N of the plurality of string winding means 1, the treatment means (device) 2 of string starting end, the treatment means (device) 3 of wound string end, and the core providing means (device) 4 are provided.

The treatment means 2 is arranged to face one of the string winding means 1 and the treatment means 3 is arranged to face one of the string winding means 1. The string winding means 1 are provided to be contiguous to one another. The treatment means 3 is located ahead of the treatment means 2 in the direction of proceeding.

A turntable 5 is provided in the inner area N, and on the turntable 5, the treatment means 2, the treatment means 3 and the core providing means 4 are provided. The turntable 5 rotates intermittently in the direction of arrow A, thus the treatment means 2 and the treatment means 3 are intermittently shifted in a circumferential direction in the inner area N and the treatment means 2 and the treatment means 3 respectively treat a string starting end and a wound string end of each of the string winding means 1 sequentially.

As shown in FIG. 1, the core providing means 4 is provided with a first storage portion 6 which stocks cores in frozen state, a second storage portion 7 which stocks cores in non-frozen state, and a core feeding portion 8 (such as a rotary feeder) provided on a passage 9 for providing core. The passage 9 is provided between the first and second storage portions 6 and 7, and the treatment means 2. Either one of the first storage portion 6 or the second storage portion 7 is selected and arranged to communicate with the core feeding portion 8 to provide cores, which are frozen or not frozen, to the treatment means 2 one by one.

In the passage 9 between the first storage portion 6 and the treatment means 2, antifreezing heater (not shown) for the passage is provided. Therefore the passage is heated and a problem described below is solved. When frozen cores (liquid centers) pass the passage 9, the passage 9 is cooled to freeze, whereby the cores may get stuck in the middle of the passage 9. However, as the passage is heated by the heater, the cores will not get stuck in the passage 9.

Figure 3:
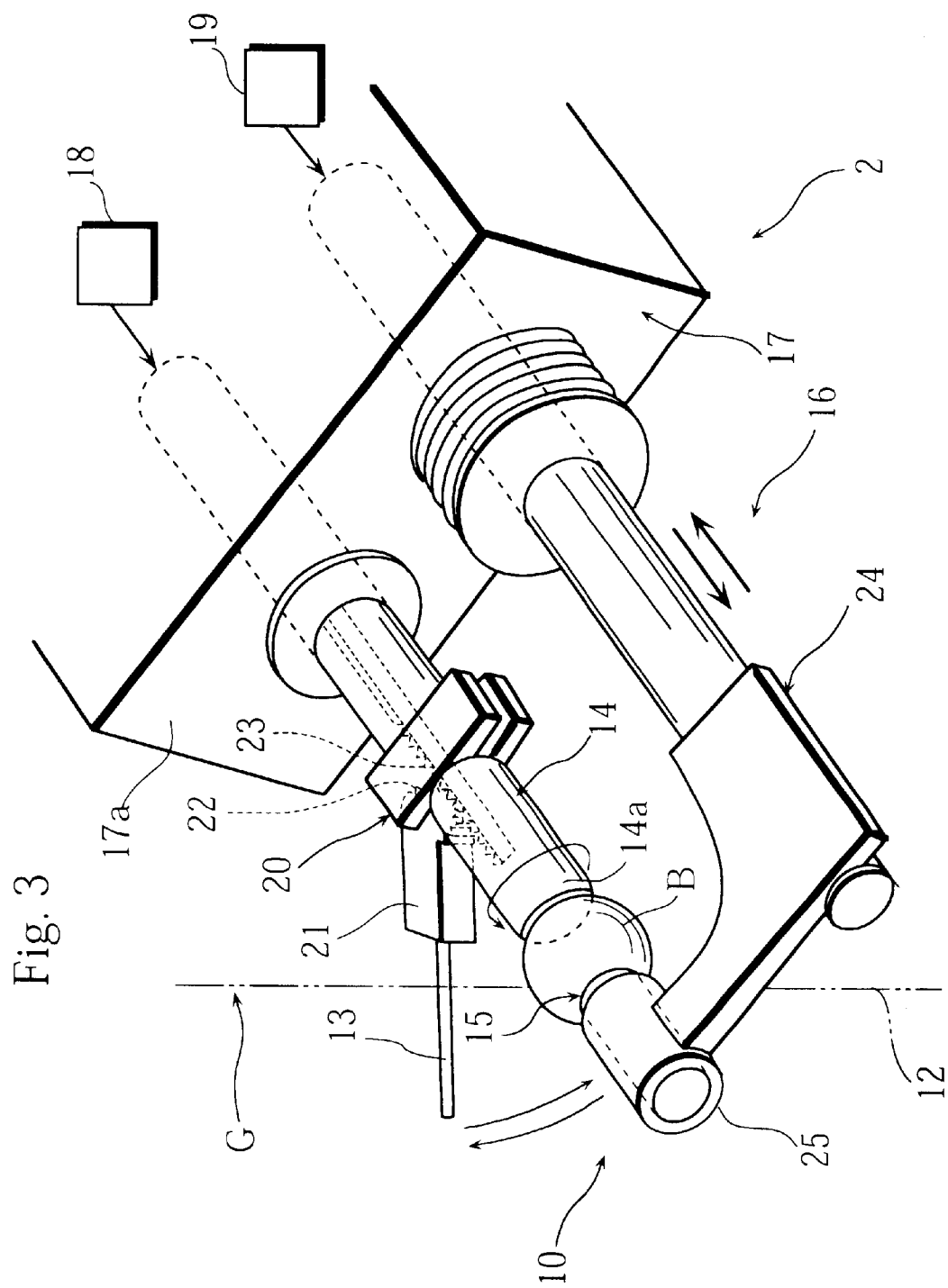
FIG. 3 is a perspective view of a principal portion showing a clamp of the treatment means of string starting end.

Next, the treatment means 2 of string starting end is described. As shown in FIGS. 2 and 3, the treatment means 2 is provided with a clamp 10 for holding a core B, a moving mechanism 11 (a robot arm, for example) to move the clamp in two dimensional direction or in three dimensional direction. The clamp 10 is provided with a holding shaft 14 to be driven to rotate having a holding needle 13 for holding down a starting end 12 of a string G on the core B, a pressing shaft 15 rotatably provided to be facing to the holding shaft 14 and holding the core B between the holding shaft 14 and the pressing shaft 15, and a clamp reciprocation mechanism 16 for moving the holding shaft 14 and the pressing shaft 15 to be close to or apart from each other.

To be specific, a box 17 is the box which a driving portion 18 (such as a motor) for rotating the holding shaft 14, and a driving portion 19 (such as a cylinder) of the clamp reciprocation mechanism 16 are built into. The holding shaft 14 protrudes substantially into horizontal direction from a side wall 17a of the box 17 as to rotate. On end 14a side of the holding shaft 14, the holding needle 13 is provided through an opening and closing mechanism 20 for oscillation. The mechanism 20 comprises an oscillating attaching piece 21 which is attached to the shaft 14 and which the needle 13 is provided at the end side of the piece 21, a pinion gear 22, a rack member 23 which is for engaging with the pinion gear 22 and provided in the holding shaft 14 as to move forward and backward, a rack reciprocation mechanism (not shown) for reciprocating the rack member 23. The rack member 23 is reciprocated to turn the pinion gear 22, and thus the needle 13 is oscillated to hold and release through the oscillating attaching piece 21.

The clamp reciprocation mechanism 16 comprises an extension arm 24, which is L-shape, or J-shape, protruded substantially into horizontal direction from a side wall 17a of the box 17 as to move back and forth, the driving means 19 for reciprocating the extension arm 24, and a boss 25 provided at the end of the extension arm 24. The pressing shaft 15 is held in the boss 25 through a bearing for example, as to freely rotate. A surface of the holding shaft 14 and a surface of the pressing shaft 15 are facing each other and each of the surfaces is formed to be concavely curved surface, or a spherical surface.

Next, as shown in FIGS. 4 to 7, the treatment means of wound string end 3 comprises a clamp 26 for holding a wound string core C, a moving mechanism 27 (a robot arm, for example) to move the clamp 26 in two dimensional direction or in three dimensional direction, a path changing lever 28 provided to the clamp 26, and a string cutting means 29 provided to the clamp 26.

Figure 5:
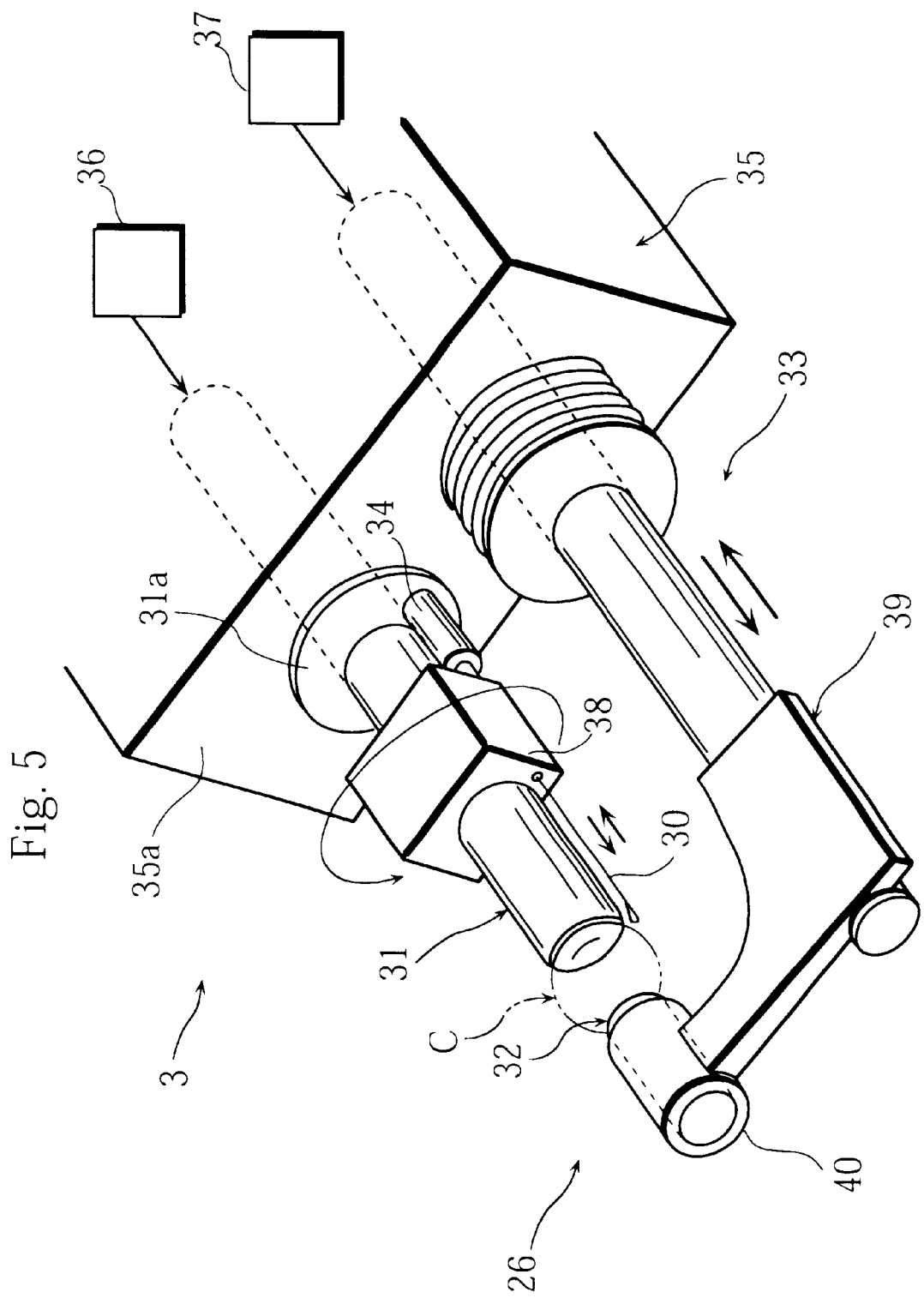
FIG. 5 is a perspective view of a principal portion showing a clamp of the treatment means of wound string end.

Specifically, as shown in FIG. 5, the clamp 26 is provided with a holding shaft 31 to be driven to rotate having a needle 30 for fastening a wound string end, a pressing shaft 32 provided to be facing to the holding shaft 31 and holding the wound string core C with the holding shaft 31, a clamp reciprocation mechanism 33 for moving the holding shaft 31 and the pressing shaft 32 to be close to or apart from each other, and a needle reciprocation mechanism 34 driven to move the needle 30 back and forth.

A box 35 is the box which a driving portion 36 (such as a motor) for rotating the holding shaft 31, and a driving portion 37 (such as a cylinder) of the clamp reciprocation mechanism 33 are built into. The holding shaft 31 is protruding substantially into horizontal direction from a side wall 35a of the box 35 as to rotate. A slide block 38 is fit on the outer circumference surface of the holding shaft 31 through a sliding key, as to slide axially and rotate with the holding portion 31. The needle 30 is fit to the slide block 38 as to be substantially parallel with the holding shaft 31. The needle reciprocation mechanism 34 is provided between the slide block 38 and the box 35. In this embodiment, the needle reciprocation mechanism 34 is a miniature cylinder of which main body portion is fit on an outer disk portion 31a on the base side of the holding shaft 31, and a rod end is fit into the slide block 38 so that the mechanism 34 rotates with the holding shaft 31. However the needle reciprocation mechanism 34 may be arranged as that the main body portion of the miniature cylinder is fixed to the box 35 and the rod end is slidably fit in a concave groove provided in the slide block 38 so that the miniature cylinder does not interfere with the rotation of the slide block 38.

The clamp reciprocation mechanism 33 comprises an extension arm 39, which is L-shape, or J-shape, protruding substantially into horizontal direction from a side wall 35a of the box 35 as to move back and forth, the driving means 37 for reciprocating the extension arm 39, and a boss 40 provided at the end of the extension arm 39. The pressing shaft 32 is held in the boss 40 through a bearing, for example, as to freely rotate. A surface of the holding shaft 31 and a surface of the pressing shaft 32 are facing each other and each of the surfaces is formed to be concavely curved surface, or a spherical surface.

Figure 8:
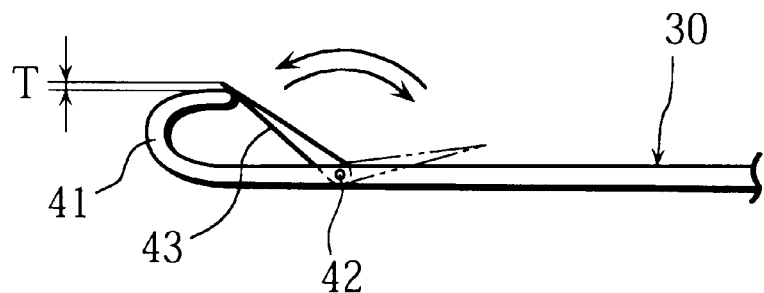
FIG. 8 is an enlarged side view of a principal portion showing a needle including a hook and a latch.

Referring to FIG. 8, the needle 30 has a hook 41 which hitches a string and provided at an end of the needle 30, and a latch 43 which is attached on the base portion of the hook through an attachment pin 42 as to be freely oscillated to open and close. When the latch 43 is closed, it forms a loop with the hook 41. In this situation, the tip end of the latch 43 is arranged to protrude from the end of the hook 41 by a slight protruding length T.

Figure 9A:
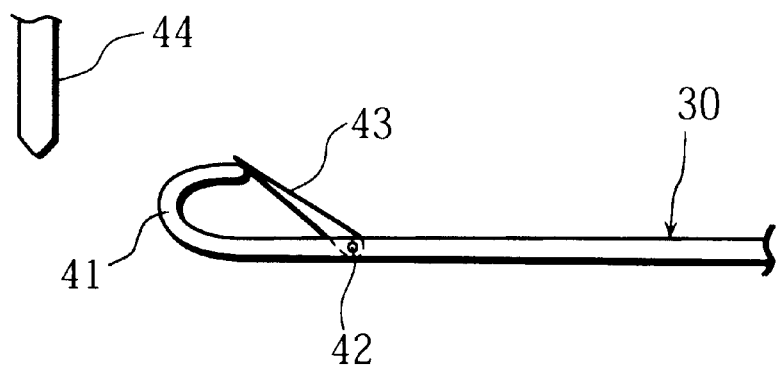
FIG. 9A is a working explanatory view showing a state that the latch is opened by raising the latch by a latch raising up portion.
Figure 9B:
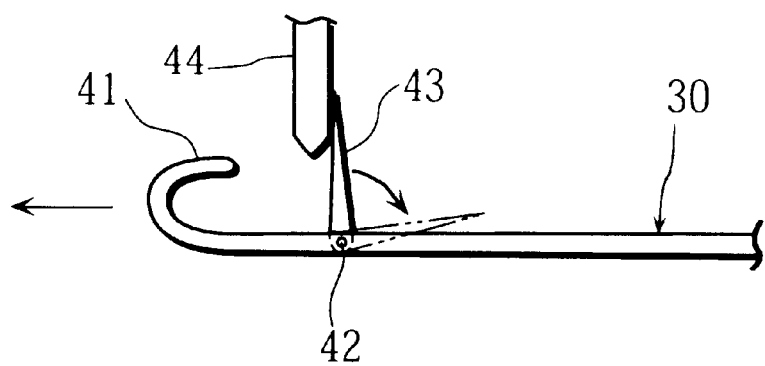
FIG. 9B is a working explanatory view showing a state that the latch is opened by raising the latch by the latch raising up portion.

To be specific, as shown in FIGS. 9A and 9B, when the needle 30 passes through under a latch raising portion 44 made of an elastic body, the tip end of the latch 43, which is closed, is caught by a lower end of the latch raising portion 44, and as the needle proceeds further, the latch portion 43 is widely opened. The latch raising portion 44 is fit to an adequate position adjacent to the boss 40 of the extension arm 39 of the clamp 26 through a fitting member, for example. Showing in FIG. 4 to FIG. 6, the Path changing lever 28 is provided to the fitting frame 45 provided on the upper face of the box 35 of the clamp 26 as to be oscillated. The lever 28 comprises an oscillating rod 48 of which upper end is fit to a fitting portion 47 protruding from a vertical wall 46 of the frame 45 to the holding shaft 31 side, an operating portion 49 which is L-shaped and provided at the lower end of the oscillating rod 48, and a sliding portion 50 which is a discoid and provided in the middle of the whole length of the rod 48. The lever 28 is oscillated to reciprocate toward the end of the holding shaft 31 in the direction of arrow Y by a reciprocation mechanism 51 described below. The lever 28 is provided between the holding shaft 31 and the extension arm 39 as seen in a top view.

The reciprocation mechanism 51 is held by the vertical wall 46 of the frame 45, and comprises a cylinder 53 of which end of a rod 52 contacts the sliding portion 50 of the lever 28, and an elastic member 54 such as a coil spring, of which one end is fit to the vertical wall 46 and the other end is fit to the oscillating rod 48 and continuously pushing the sliding portion 50 toward the rod 52 side. As the cylinder 53 is driven to extend, the rod 52 presses the sliding portion 50 and thereby the oscillating rod 48 and the operation -portion 49 are oscillated to the holding shaft 31 side in the direction of arrow Y. At the same time, the operation portion 49 contacts an wound end portion of the string 6 of the wound string core C to move the position, and this process is described specifically below.

Figure 7:
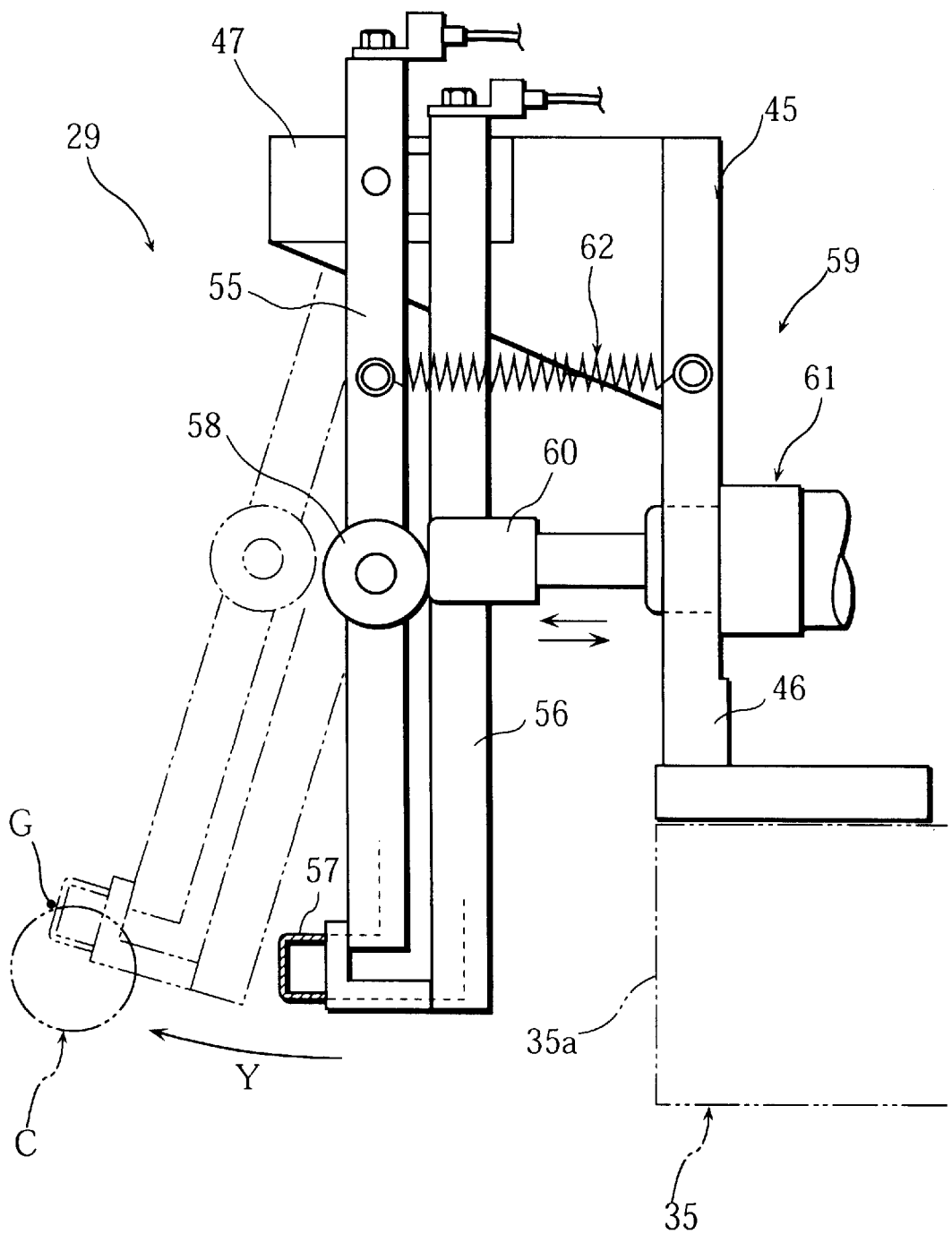
FIG. 7 is a side view of a principal portion showing a string cutting means.

Next, as shown in FIG. 7, a string cutting means 29 is attached to the frame 45 together with the path changing lever 28 side by side. The cutting means 29 comprises a first oscillating rod 55 of which upper end is attached to the fitting portion 47 of the frame 45, a second oscillating rod 56 provided to be parallel with the first oscillating rod 55, an electric heating portion 57 provided on a lower connecting portion of the first oscillating rod 55 and the second oscillating rod 56, a sliding portion 58 which is a discoid and provided in the middle of the whole length of the first rod 55, and a reciprocation mechanism 59 which reciprocates the first rod 55 and the second rod 56 toward the end of the holding shaft 31, in the direction of arrow Y. As the lever 28 is provided, the first oscillating rod 55 and the second oscillating rod 56 are also provided between the holding shaft 31 and the extension arm 39 of the clamp 26 as seen in a top view (See FIG. 5).

The reciprocation mechanism 59 is held by the vertical wall 46 of the frame 45, and comprises a cylinder 61 of which end of a rod 60 contacts the sliding portion 58 of the first rod 55, and an elastic member 62 such as a coil spring, of which one end is fit to the vertical wall 46 of the frame 45 and the other end is fit to the first oscillating rod 55 and continuously pushing the sliding portion 58 toward the rod 60 side. As the cylinder 61 is driven to extend, the rod 60 presses the sliding portion 58 and thereby the first and second oscillating rods 55 and 56 and the electric heating portion 57 are oscillated to the holding shaft 31 side, in the direction of arrow Y. Then the electric heating portion 57 which is heated cuts a wound end portion of a string G of a wound string core C, and this process is described specifically below.

Figure 10:
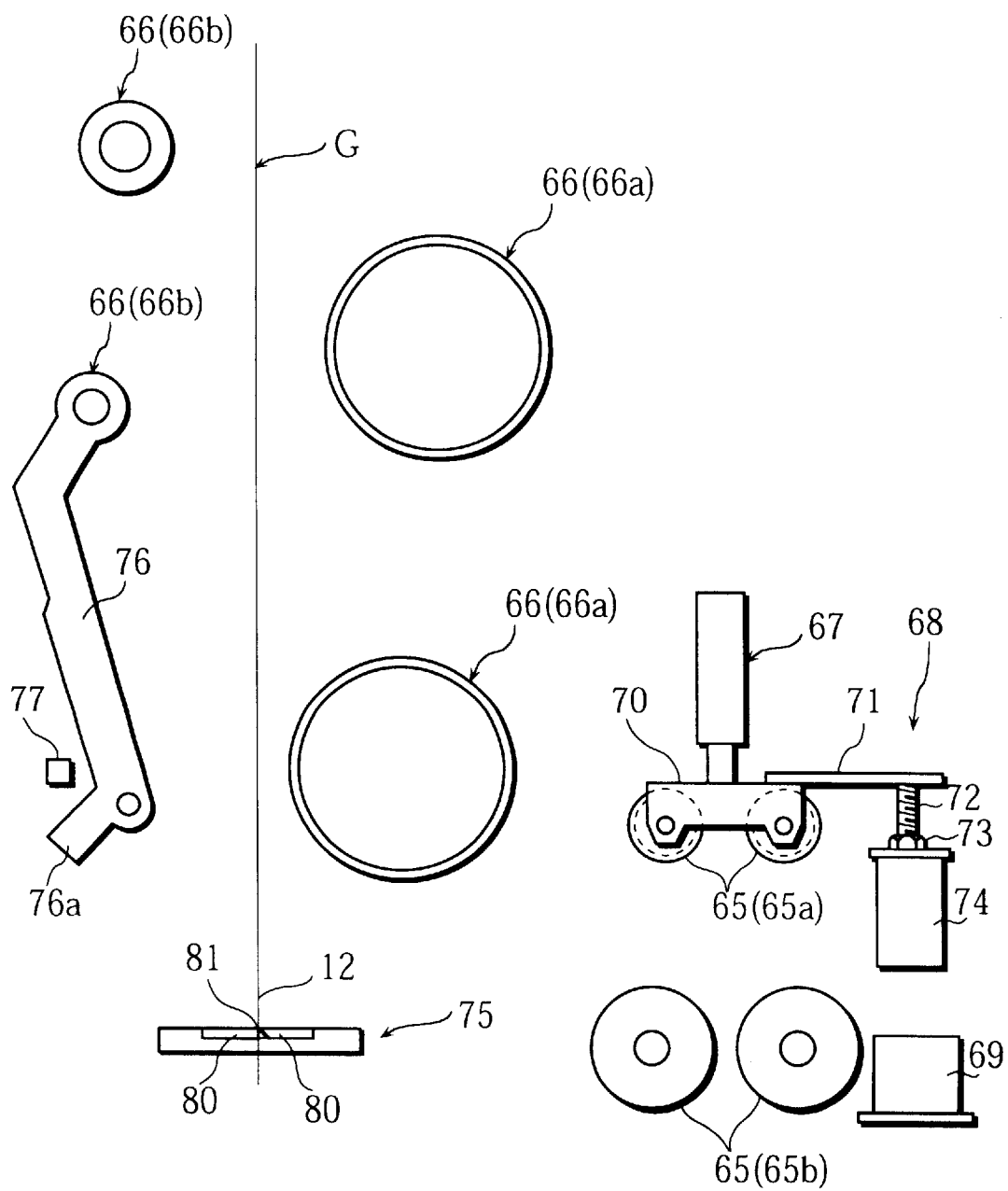
FIG. 10 is an explanatory view showing positions of string winding rollers, tension rollers and a chuck.

Next, as shown in FIGS. 2, 4 and 10, the string winding means 1 comprises a main body portion 63, upper and lower string winding rollers 65 provided on an inner side wall 64 side of the main body portion 63, and tension rollers 66 provided as to rotate on the inner side wall 64 side of the main body portion 63.

The upper and lower string winding rollers 65 include a pair of upper rollers 65a, and a pair of lower rollers 65b each of which has a greater diameter than that of each upper roller 65a. The pair of lower rollers 65b are arranged to reciprocate in the axial direction and the horizontal direction traversing the axis of each roller 65b, and at least one of the lower rollers 65b is driven to rotate.

As shown in FIG. 10, a holding pressure adjustment mechanism 68, which is provided adjacent to the rollers 65 and which adjusts an initial holding pressure of the rollers 65 to hold a core. The adjustment mechanism 68 comprises a receiving base portion 69 provided adjacent to the lower rollers 65, a fitting plate 71 connected to an upper roller holding cover 70 provided under the end of a cylinder 67, an external screw 72 vertically provided to the fitting plate 71, a nut portion 73 for being screwed into the external screw 72, and a contacting member 74, made of elastic material (such as rubber), provided to be united with the nut portion 73.

The tension rollers 66 include two large rollers 66a, and two small rollers 66b. The upper and lower large rollers 66a are provided on the right side (the string winding rollers 65 side) of a string G held to be extended vertically by a chuck 75, described later. The upper and lower small rollers 66b are provided on the left side of the string G.

Figure 12:
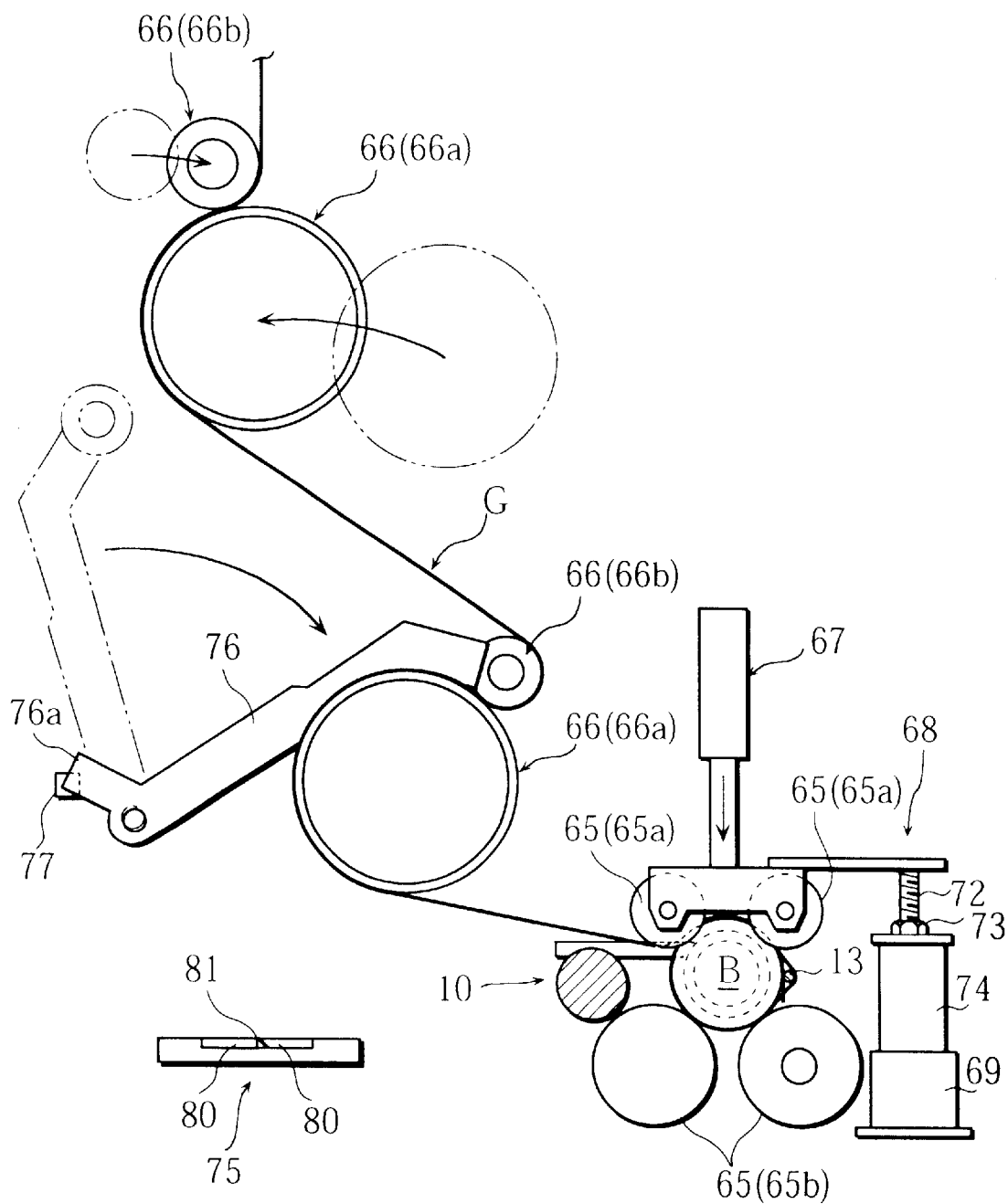
FIG. 12 is an explanatory view showing a state that tension is applied to a string by tension rollers.

As shown in FIG. 12, the upper large roller 66a and the upper small roller 66b are arranged to move close to each other, and the lower small roller 66b is arranged to move to the lower large roller 66a side. When the tension rollers 66 are moved, tension is applied to the string G. The lower small roller 66b is attached at an end of an oscillating arm 76 as to freely rotate. At a base end of the oscillating arm 76, a piece 76a to be detected is provided, and an adjacent sensor 77 is arranged near the base end of the oscillating arm 76.

Showing in FIGS. 2 and 10, the golf ball apparatus comprises a hand 78 for holding and pulling to extend the starting end 12 of the string G, and the chuck 75 for holding the string G extended. The hand 78 has a holding portion 79 which opens and closes freely and moves in a two dimensional direction or a three dimensional direction. The holding portion 79 is lowered to transfer the starting end 12 of the string G to the chuck 75 while holding the starting end 12 which is provided to the string winding apparatus 1 from a string providing means, not shown, through a feeding roller. The chuck 75 has a pair of chuck portions 80 which freely open and close, and the chuck portions 80 hold to receive the starting end of the extended string G. One of the chuck portions 80 (on the rollers 65 side) is provided with a blade portion 81 for cutting the string.

Each of the string winding portions 1 is provided with the chuck 75 on the inner wall 64 side of the main body portion 63. The hand 78 is provided in the inner area N around which the string winding portions 1 are provided, and the hand 78 moves with the treatment means 2 of string starting end intermittently in a circumferential direction.

Next a method (process) for manufacturing a golf ball is described with reference to the accompanying drawings. As shown in FIG. 1, the turn table 5 is intermittently turned, and the treatment means 2 of string starting end makes one rotation to treat each starting end of each string of each string winding means 1 one after another. While the treatment means 2 is working, the treatment means 3 of wound string end is in waiting state.

Specifically as shown in FIG. 2 and FIG. 10, the hand 78 holds and pull to extend the starting end 12 of the string G, and the starting end 12 extended is held by the chuck 75. After that, the hand 78 is backed to be apart from the chuck 75. The holding portion 79 of the hand 78 may be provided with a blade portion for cutting a part of the string extending below the holding portion 79 when moving apart from the chuck 75.

Referring to FIG. 3, on the treatment means 2 side, the holding shaft 14 and the pressing shaft 15 of the clamp 10 hold the core B. Cores B are sent from the core providing means 4 one by one, described with reference to FIG. 1, through the passage 9, and each core B stopped at the end of the passage 9 is held with the clamp 10.

Figure 11A:
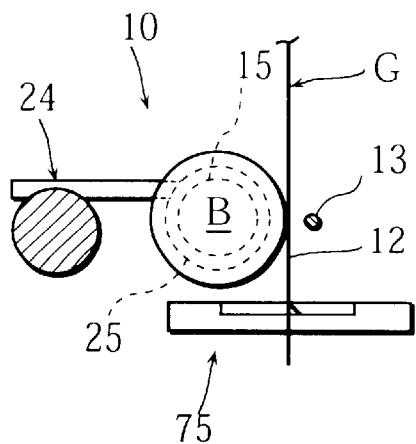
FIG. 11A is a working explanatory view showing a step of winding string starting end.

After that, as shown in FIGS. 3 and 11A, the clamp 10 holding the core B is moved to be close to the extended string G. In this process, the holding needle 13 of the holding shaft 14 is in the released state, and the clamp 10 is stopped at a position where the string G comes between the released needle 13 and the core B.

Figure 11B:
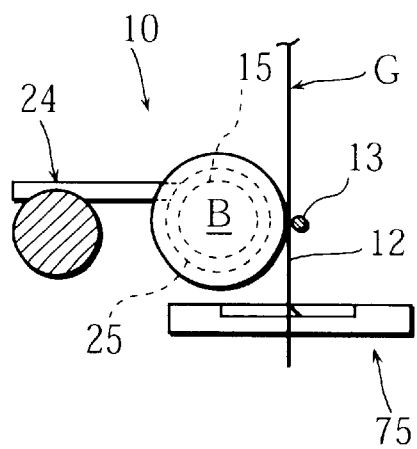
FIG. 11B is a working explanatory view showing a step of winding string starting end.
Figure 11C:
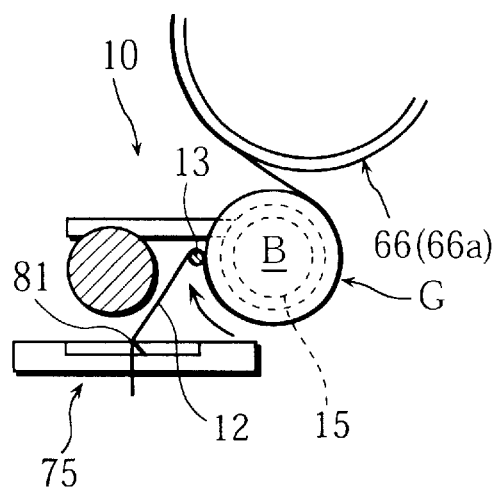
FIG. 11C is a working explanatory view showing a step of winding string starting end.
Figure 11D:
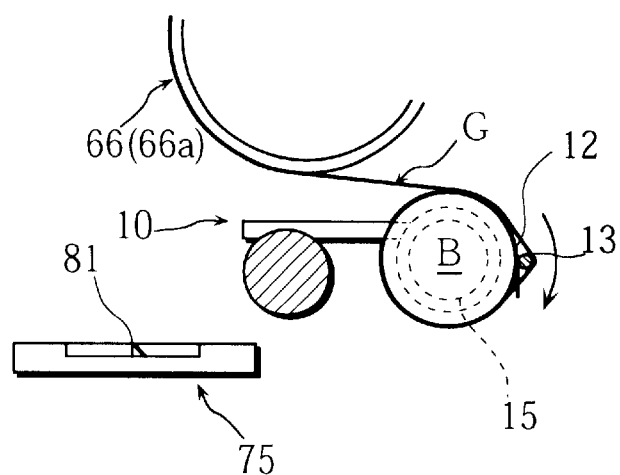
FIG. 11D is a working explanatory view showing a step of winding string starting end.

Then as shown in FIGS. 3 and 11B, the needle 13 is oscillated to be close state by the opening and closing mechanism 20 for oscillation so that the needle 13 holds and presses down the starting end 12 or the adjacent end portion of the string to the core B.

Next as shown in FIGS. 3, 11C, 11D and 12, the holding shaft 14 is driven to rotate and thus the core B makes an adequate number of rotations (1–3 times) while moving the clamp 10 to the rollers 65 side. Because the needle 13 is rotated with the core B, and because of the winding of the string G and the shifting of the clamp 10, the starting end 12 of the string G is pulled to the blade 81 side of the chuck, and the string G is cut by the blade 81.

As shown in FIG. 12, as the core B comes between the upper and lower string winding rollers 65, the clamp 10 is lowered to bring the core B in contact with the lower rollers 65b, and the upper rollers 65a are moved down, or moved to the lower rollers 65b side. Thus the upper rollers 65a and the lower rollers 65b hold the core B and the string G.

The contacting member 74 of the holding pressure adjustment mechanism 68 contacts the receiving base portion 69 and the holding pressure of the upper rollers 65a for holding the core B is regulated, and thereby the core B can be held by the upper rollers 65a and lower rollers 65b softly with an adequate holding pressure. That is to say, by holding the core B with the adequate holding pressure, the core B is prevented from being deformed on the initial stage of the string winding process. The holding pressure adjustment mechanism 68 can adjust the holding pressure of the rollers easily by rotating the contacting member 74 to screw the nut portion 73 into upward and downward the external screw 72. The tension rollers 66 are moved, and the pairs of large roller 66a and the small roller 66b pull the string G to extend, and tension is applied to the string G. The oscillating arm 76 is oscillated and the piece 76a at the base end of the arm 76 is moved to be adjacent to the sensor 77.

Figure 13A:
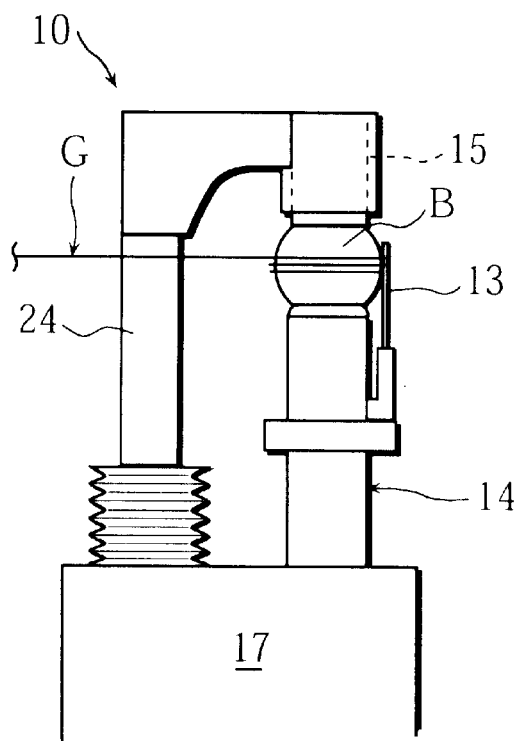
FIG. 13A is a working explanatory view showing a state the clamp is separated from the core.
Figure 13B:
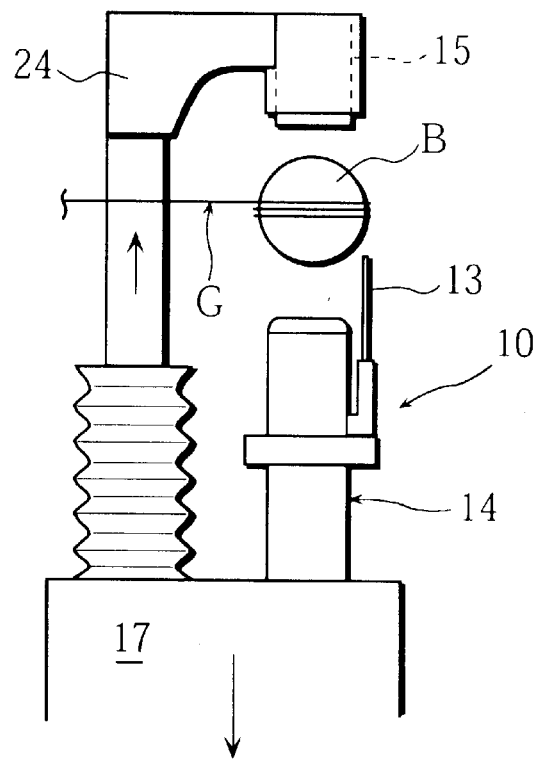
FIG. 13B is a working explanatory view showing a state the clamp is separated from the core.
Figure 14A:
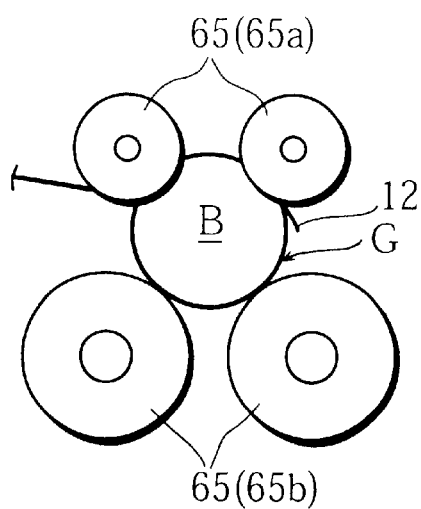
FIG. 14A is an explanatory view showing a state the string and the core are held only by string winding rollers.
Figure 14B:
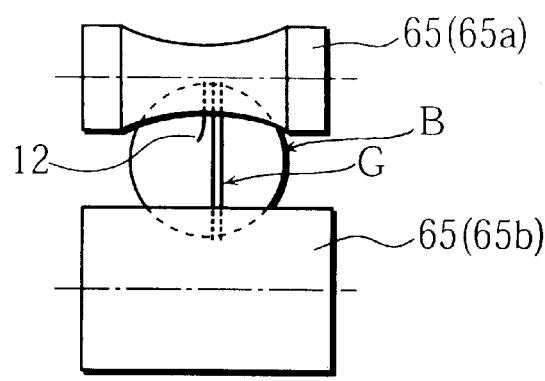
FIG. 14B is an explanatory view showing a state the string and the core are held only by the string winding rollers.

In FIG. 13A, the clamp 10 is holding the core B with the upper and lower rollers, not shown. Then the holding shaft 14 and the pressing shaft 15 are moved to be apart from each other as shown in FIG. 13B, and the needle 13 is moved back to be pulled out from the starting portion of the wound string G on the core B. And the core B and the string G are held only by the upper and lower rollers 65. The clamp 10 is moved back to a position apart from the string winding rollers 65.

As described above, the treatment of starting end of the string G is completed, i.e. preparation for the next process, string winding process, is completed, then the lower rollers 65b of the string winding rollers 65 are driven to rotate and the core B makes rotations to wind the string G on the core B while supplying the string G to the surface of the core B. When the string runs out, or snaps off to suspend the supply of the string G, the small roller 66b provided at the end of the oscillating arm 76, applying tension to the string G, is slightly oscillated down in the direction of arrow D, and thus the piece 76a provided on the base end of the arm 76 is detected by the adjacent sensor 77. The sensor 77 send signals to stop the driving roller (lower roller 65b) of the string winding rollers 65.

Now referring to FIG. 1 again, after receiving the core from the treatment means 2, each string winding means 1 starts the winding process. When the treatment means 2 is at the position facing to the last string winding means 1 to treat the string starting end, the treatment means 3 of wound string end is at the position facing to the first string winding means 1 to treat the wound string end. That is to say, while the treatment means 2 is making one rotation on the inner area N, string winding process of each winding means 1 is arranged to be finished. In this embodiment, twelve string winding means 1 are shown, and the turn table 5 makes one round in two minutes.

Figure 15:
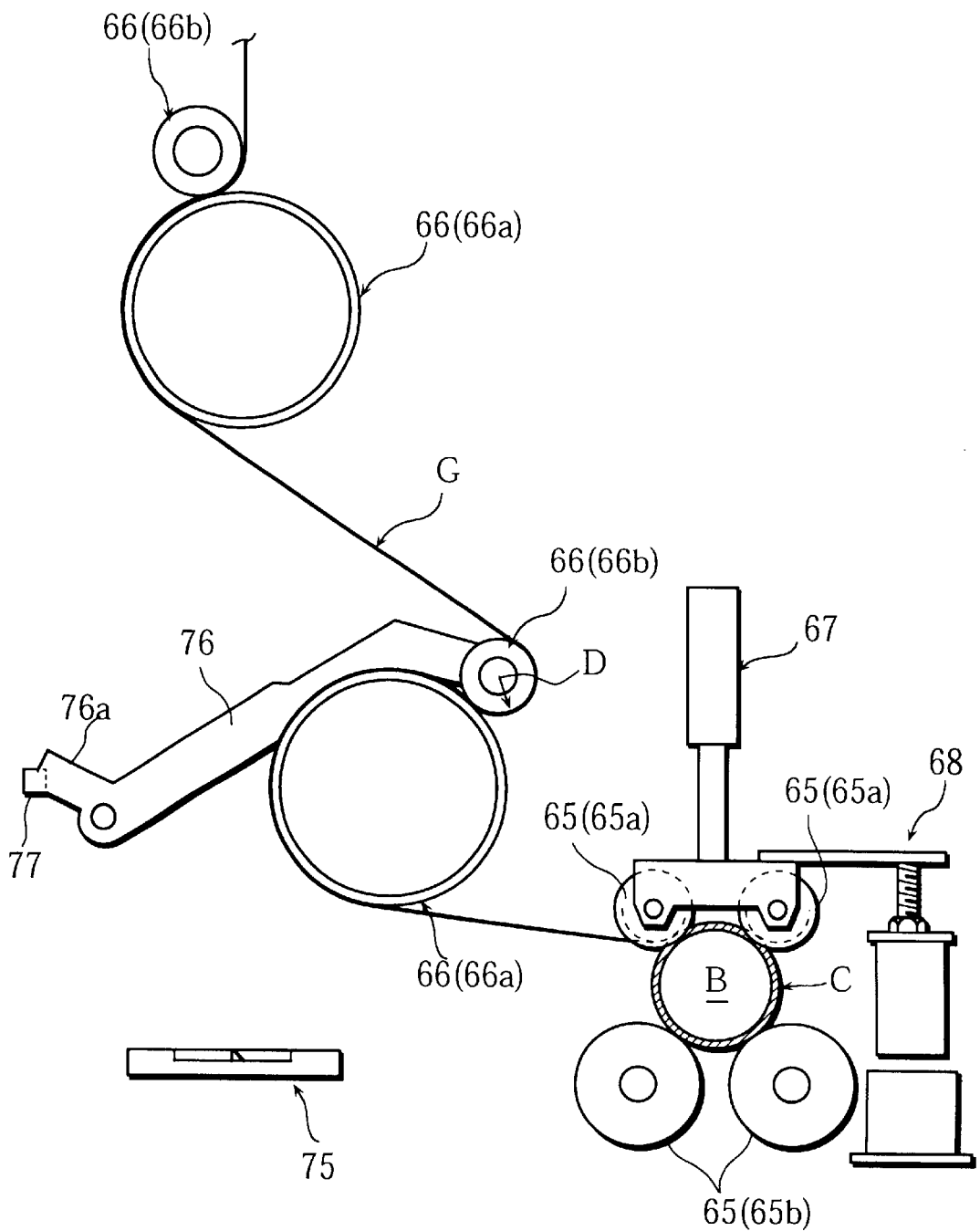
FIG. 15 is an explanatory view showing a state a winding process is finished.

Next the process of treating the wound string end is described. FIG. 15 is a view showing a completed state of such winding process that the core B is held and rotated by the upper and lower rollers 65 to wind the string on the core B while the string G is being supplied to the surface of the core B. When the upper rollers 65a holding the wound string core C are moved up to the predetermined position, it means that the predetermined amount of the string is wound on the core B, and the lower roller 65, which is driven to rotate, is stopped and the winding process is automatically finished.

When the winding process is finished, as shown in FIG. 4, the clamp 26 of the treatment means 3 which is at the position apart from the string winding means 1 is moved to the string winding means 1 side.

Figure 16A:
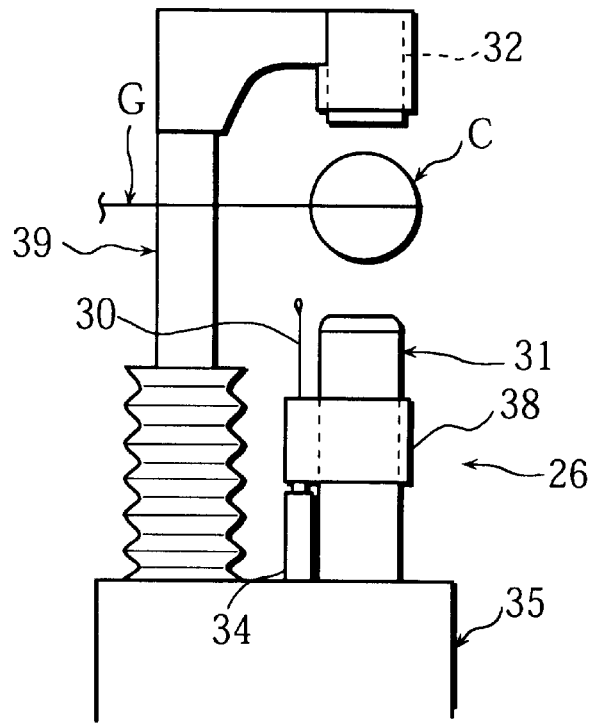
FIG. 16A is a working explanatory view showing a state the clamp of the treatment means of string starting end is holding a wound string core.

Then as shown in FIGS. 16A, the clamp 26, which is released, comes close to the wound string core C held by string winding rollers, not shown. Then as shown in FIG. 16B, the holding shaft 31 and the pressing shaft 32, facing each other, are moved to be close to each other and hold the string wound core C.

Figure 16B:
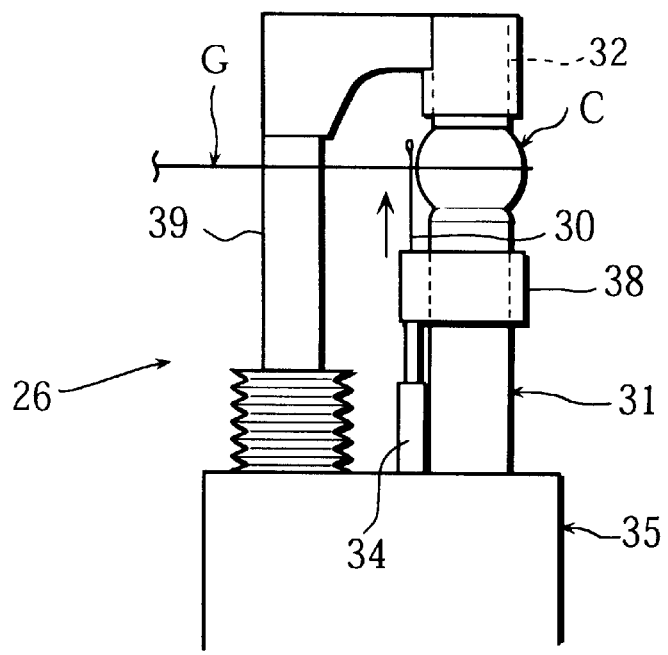
FIG. 16B is a working explanatory view showing a state the clamp of the treatment means of wound string end is holding the wound string core.
Figure 17:
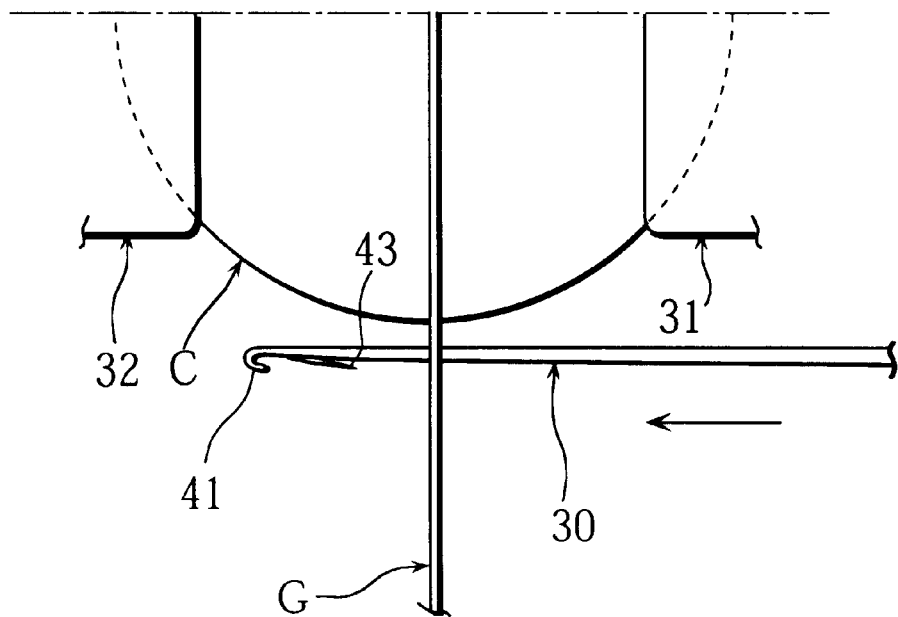
FIG. 17 is a first explanatory view showing a step of treatment of wound string end.

As shown in FIG. 16B and FIG. 17, the needle reciprocation mechanism 34 pushes the needle 30 forward to the pressing shaft 32 side, so that the needle 30 comes close to the wound string core C. While being pushed to the string core C side, the hook 41 of the needle 30 passes under the string G and as described above with reference to FIG. 9, the latch raising portion 44 raises the latch 43.

As the wound string core C is held by the clamp 26, the upper string winding rollers 65 are moved up and the clamp 26 is also moved up a little, so that the wound string core C is separated from the upper and lower string winding rollers 65.

Figure 6:
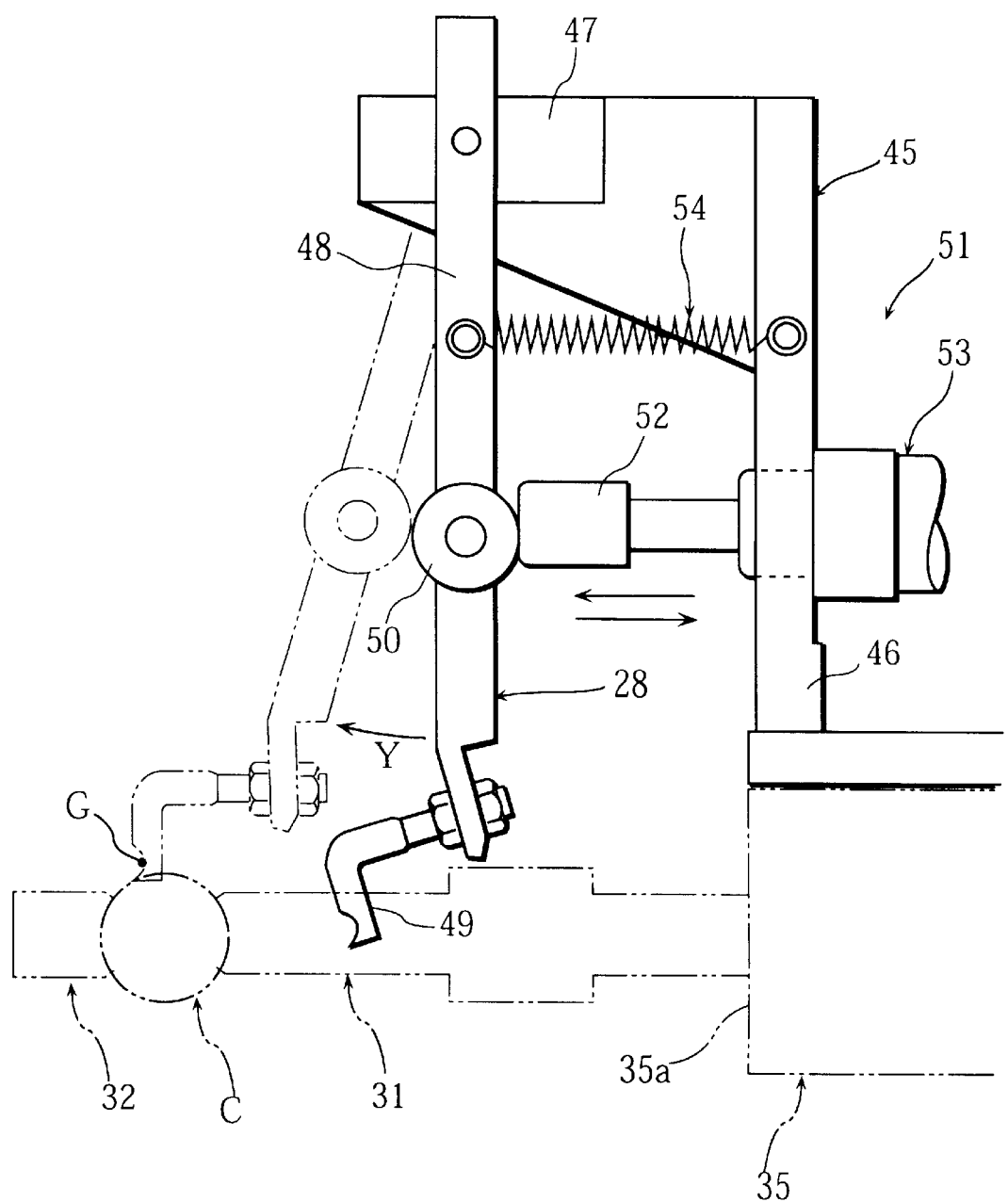
FIG. 6 is a side view of a principal portion showing a path changing lever and a reciprocation mechanism;.
Figure 18:
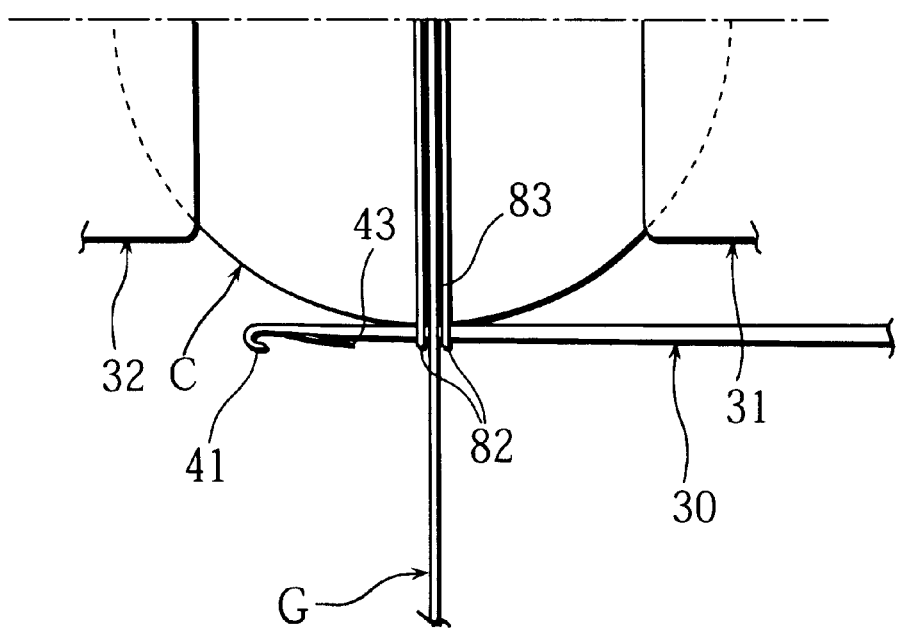
FIG. 18 is a second explanatory view showing a step of treatment of wound string end.
Figure 19:
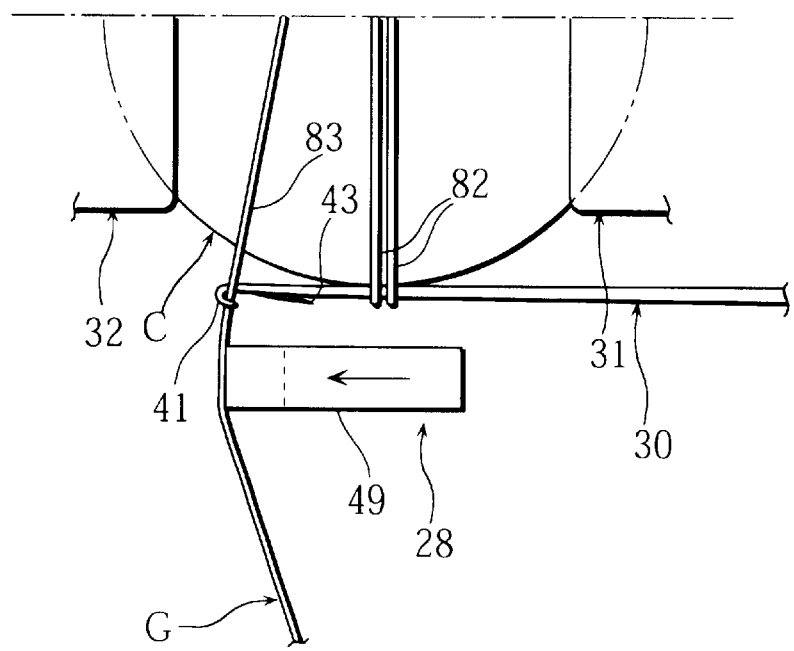
FIG. 19 is a third explanatory view showing a step of treatment of wound string end.

After that, as shown in FIG. 18, the holding shaft 31 and the pressing shaft 32 are driven to rotate, thereby the wound string core C makes an adequate times of rotations (1–3 times) to wind the string G around the wound string core C to form additional winding portion 82. After the rotations are completed, as shown in FIGS. 6 and 19, the cylinder 53 oscillates the path changing lever 28 to shift the wound end portion 83 of the string G to the hook 41 side so that the end portion 83 is hitched by the hook 41 of the needle 30.

Figure 20:
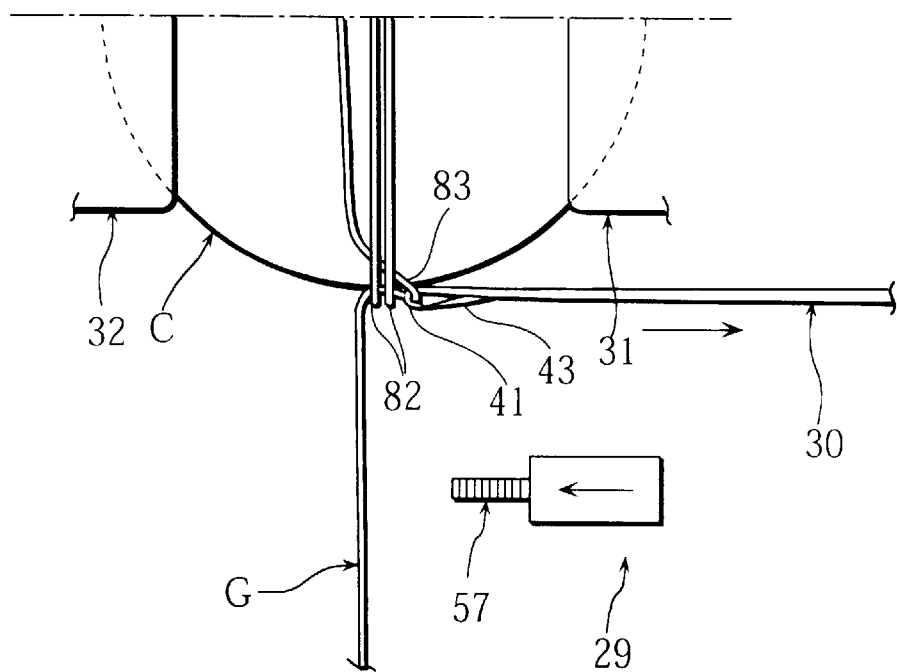
FIG. 20 is a fourth explanatory view showing a step of treatment of wound string end.

As shown in FIG. 20, the needle 30 is moved back to pull the end portion 83 so that the end portion 83 comes under the additional winding portion 82, while hitching the end portion 83 by the hook 41. That is to say, as the needle 30 passes under the additional winding portion 82, the base end of the latch 43 widely opened is hit or touched by the winding portion 82 and the latch 43 is closed to form the loop with the hook 41. Thus the hook 41 is moved back to pull the end portion 83 under the winding portion 82 without being caught by the winding portion 82.

Figure 21:
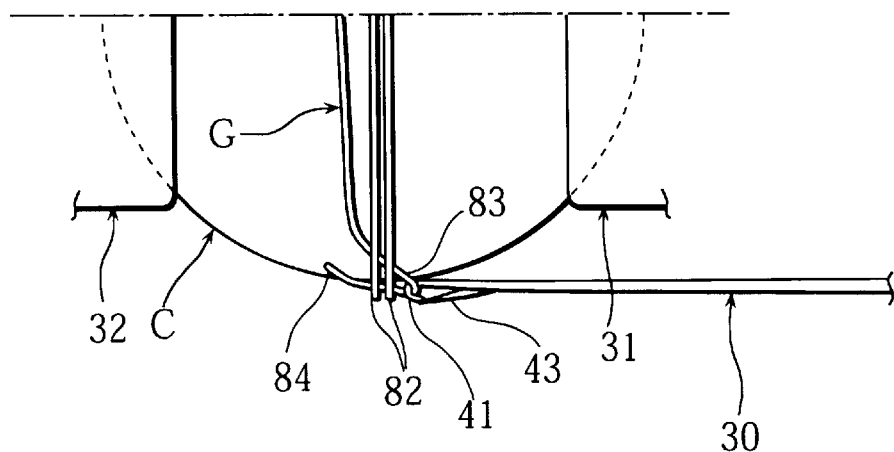
FIG. 21 is a fifth explanatory view showing a step of treatment of wound string end.
Figure 22:
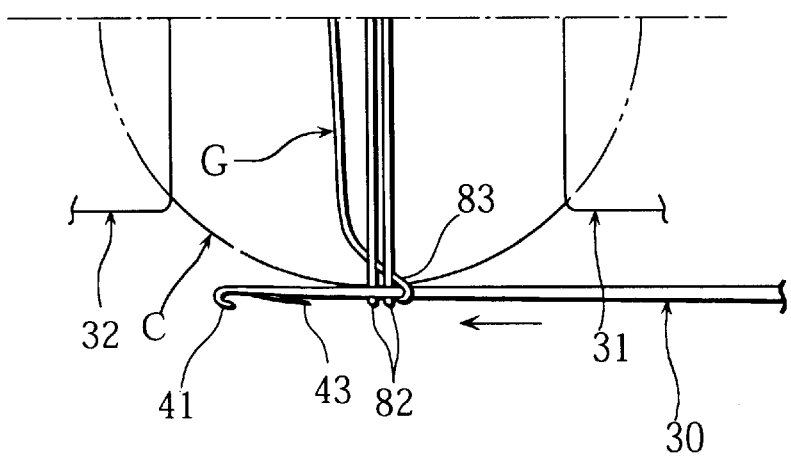
FIG. 22 is a sixth explanatory view showing a step of treatment of wound string end.

Then as shown in FIG. 7 and FIG. 20, the first oscillating rod 55 and the second oscillating rod 56 are oscillated to move to the string G side, and the electric heating portion 57, to which an electric current is applied, comes close to or contacts with the string 6, and thus the string G is cut as shown in FIG. 21. The cut end of the string is the end 84. As shown in FIG. 22, the needle 30 is moved forward again and the latch 43 is hit by the end portion 83 and opened.

The opened latch 43 passes through a loop portion formed by the additional winding portion 82 and the wound end portion 83, thereby the needle 30 is arranged to pass above the additional winding portion 82.

Figure 23:
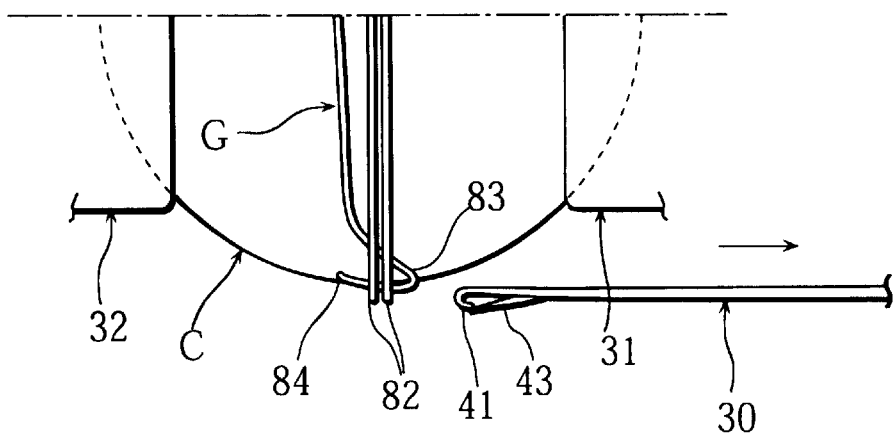
FIG. 23 is a seventh explanatory view showing a step of treatment of wound string end.

After that, as shown in FIG. 23, the needle 30 is moved back again and the latch 43 is hit by the end portion 83 and closed. Thereby the hook 41 forming the loop with the latch 43 passes the loop portion of the string smoothly, and the needle 30 goes apart from the wound end portion 83. Accordingly, the end of the string G is fastened. After that, the clamp is released, or the holding shaft 31 and the pressing shaft 32 are moved apart from each other, and the wound string core C of which wound string end is treated is removed.

Referring to FIG. 1 again, according to the present invention, wound string cores are formed effectively, because the treatment means 3 for fastening the end of the string which is wound around each wound string core obtained by winding the string on each core, and the treatment means 2 for winding the starting end of the string on each core and transferring the core to each string winding means 1 are provided in the inner area N around which the string winding means 1 are provided in a circle at regular intervals, and the treatment means 2 and the treatment means 3 are shifted intermittently in the circumferential direction to operate the string starting end treatment and the wound string end treatment respectively to each of the string winding means 1.

With the method for manufacturing golf ball according to the present invention, as described above with reference to FIG. 15, in the process of winding the string G, when the string runs out, or snaps off to suspend the supply of the string G, signals sent from the adjacent sensor 77 stop the rollers 65 to suspend string winding. However, the string G is again started to be wound, except a predetermined case.

Before starting to wind the string again on the wound string core C, the string winding rollers are suspended and the fastening process of the wound string end of the core C is not operated. Then the clamp 10 of the treatment means 2 is moved to the string winding rollers 65 and the clamp 10 takes out the wound string core C from the rollers 65, and treatment of string starting end is operated again, that is a starting end 12 of a string is started to be wound on the core. The core C that the starting end of the string is wound is set between the rollers 65 again and string winding process is started again. Such wound cores are separately sent to the appearance inspection process. To be specific, the wound string cores each of which string is normally wound, and the wound string cores each of which string is once suspended and started to be wound again, are sorted and put into different chutes.

The predetermined case of which string will not be started to be wound again is the case that cores each of which has a liquid center and supply of the string is suspended before passing the predetermined seconds (25 seconds, for example) from the string winding process is started. Such wound string cores are all decided to be defect. In such a short time as 25 seconds from the starting of string winding process, the string can not be equally wound on the core, and each liquid centers thaw as time passes by, therefore such cores are easy to be deformed.

When each of the cores is a liquid center, and in case string supply is suspended between a first predetermined time such as 25 seconds after string winding is started and a second predetermined time such as 40 seconds after string winding is started, it is possible to start winding string on the core again if the rewinding process is started before passing a third predetermined time such as 180seconds. If it is Passed the third predetermined time before rewinding the string on the core, the cores of which supply of string is suspended are decided to be defective. That is to say, in case the amount of time passed before starting rewinding string is not long, it is possible to start winding string on the cores again. However if it takes too long to start rewinding string, liquid centers start to thaw and such centers are not strong enough to be wound by the string any more. Therefore such cores are decided to be defective.

It is preferred to set conditions to decide whether cores are to be string wound again or to be defective. Specifically the conditions shown below is preferred to be set. If the supply of the string is suspended again while rewinding the string on the core, the core having an outer diameter over the predetermined diameter (more than 35 mm, for example) at this stage is started to be wound string again. The core having an outer diameter below the predetermined diameter at this stage is decided to be defective.

According to the apparatus of the present invention for manufacturing a golf ball, a construction of the clamp 10, provided for holding and rotating the core B to operate the treatment of starting end of the string, is simplified. Moreover, because the apparatus is constructed as that the string G is wound on the core and the holding needle which is put on the core, the holding needle 13 can be pulled out from the wound string 6 smoothly by moving back the clamp 10 apart from the core B held by the string winding rollers 65. Therefore it is possible to move on swiftly to the next process, that is the string winding process.

Furthermore, holding down the starting end 12 of the string on the core B by the holding needle 13 can be easily carried out for sure. That is to say, winding the starting end of the string G is ensured to be operated easily.

Additionally, a construction of the clamp 26, provided for holding and rotating the wound string core C to operate the fastening treatment of wound end of the string, is simplified. And, because the needle 30 having the hook 41 and the latch 43 is used, the treatment of the wound string end is operated in short seconds. Thus the wound string cores C can be formed effectively. Moreover, the string G is automatically cut, and the treatment of the wound string end is operated for sure.

Furthermore, the treatment means 3 of wound string end and the treatment means 2 of string starting end respectively operate the treatment of the wound string end and the treatment of the string starting end sequentially in respect of each string winding means 1, each of which is provided to be contiguous to one another, therefore the wound string cores C are manufactured effectively. Miniaturization and simplification of the whole apparatus can be done.

According to the method of the present invention for manufacturing a golf ball, the starting end of the string is ensured to be treated easily. And because the apparatus is constructed as that the string G is wound on the core and the holding needle 13 which is put on the core, the holding needle 13 can be pulled out from the wound string G smoothly after holding the core B by the string winding rollers 65. Therefore it is possible to move on swiftly to the next process, that is the string winding process.

Moreover, the wound end of the string is ensured to be treated easily, and because the needle 30 having the hook 41 and the latch 43 is used, movement of the machine apparatus for treatment of the wound string end is simplified.

Furthermore, the treatment means 3 of wound string end and the treatment means 2 of string starting end respectively operate the treatment of the wound string end and the treatment of the string starting end sequentially in respect of each string winding means 1, each of which is provided to be contiguous to one another, therefore the wound string cores C are manufactured effectively. And, because rewinding of the string on the wound string cores C are operated, the cores C decided to be defective products are reduced.

While preferred embodiments of the present invention have been described in this specification, it is to be understood that the invention is illustrative and not restrictive, because various changes are possible within the spirit of the indispensable features.

What is claimed is:

1. A golf ball manufacturing apparatus for obtaining a wound string core by winding a string, made of rubber, on a core, the apparatus comprising:

a string winding means for winding the string on the core, the string winding means including upper and lower pair of string winding rollers for holding and rotating the core to wind the string on, the pair of rollers arranged to move close to and apart from the other pair of rollers; and a treatment means of string starting end for winding a starting end of the string on the core and for transferring the core to the string winding means, the treatment means including a clamp provided with a holding shaft to be driven to rotate having a holding needle for holding down the starting end of the string on the core, a rotatable pressing shaft facing to the holding shaft and holding the core with the holding shaft, and a clamp reciprocation mechanism for moving the holding shaft and the pressing shaft to be close to or apart from each other, and a moving mechanism for moving the clamp to the upper and lower string winding rollers side.

2. A golf ball manufacturing apparatus as set forth in claim 1, wherein a hand for holding and pulling the starting end to extend the string, and a chuck for holding the string extended are provided and the holding needle is arranged to hold down the extended string on the core.

3. A golf ball manufacturing apparatus for obtaining a wound string core by winding a string, made of rubber, on a core, the apparatus comprising:

a treatment means of wound string end for holding a wound string core of which string winding process is finished and fastening an end of the string, the treatment means including a clamp provided with a holding shaft to be driven to rotate having a needle to be moved back and forth for fastening the string end, a rotatable pressing shaft facing the holding shaft and holding the wound string core with the holding shaft, a clamp reciprocation mechanism for moving the holding shaft and the pressing shaft to be close to and apart from each other, and a needle reciprocation mechanism driven to move the needle back and forth, and a path changing lever for shifting a wound end portion of the string wound on the wound string core;

the needle of which end having a hook for hitching the wound end portion of the string shifted by the path changing lever, and the needle further having a latch attached on a base portion of the hook as to be freely oscillated to open and close, the latch forming a loop with the hook when the latch is in closed state.

4. A golf ball manufacturing apparatus as set forth in claim 3, wherein a string cutting means is provided for cutting the string to form the end.

5. A golf ball manufacturing apparatus for obtaining a wound string core by winding a string, made of rubber, on a core, the apparatus comprising:

a plurality of string winding means provided in a circle at regular intervals, for winding the string on the core;

an inner area around which the string winding means are provided;

a start treatment means for winding a starting end of the string on the core, and an end treatment means for fastening an end of the string of a wound string core at the end of the winding process, the start and end treatment means provided in the inner area and arranged separately to face each string winding means, the start treatment means and the end treatment means intermittently shifted in the inner area respectively operating the start treatment and the end treatment in respect of each of the string winding means sequentially, each of the string winding means provided to be contiguous to each other.

6. A golf ball manufacturing apparatus as set forth in claim 5, wherein a core providing means for providing the core to the start treatment means is provided in the inner area of the plurality of string winding means.

7. A golf ball manufacturing method for obtaining a wound string core by winding a string, made of rubber, on a core, the method comprising the steps of:

holding the core between a holding shaft, which is to be driven to rotate and which has a holding needle to hold down the string on the core, and a pressing shaft, which moves relative to the holding shaft;

moving the holding shaft and the pressing shaft to a position adjacent to the string, and holding down a starting end of the string on the core by the holding needle;

rotating the holding shaft and the pressing shaft to wind the string on the core and the needle;

moving the holding shaft and the pressing shaft to a position between upper pair of rollers and lower pair of rollers, and moving the upper pair of rollers and the lower pair of rollers to be close to each other to hold the core;

moving the holding shaft and the pressing shaft to be apart from the core and thereby pulling out the needle from the string; and rotating the core by string winding rollers to wind the string on the core.

8. A golf ball manufacturing method for obtaining a wound string core by winding a string, made of rubber, on a core, the method comprising the steps of:

winding the string on the core to form the wound string core;

holding the wound string core between a holding shaft to be driven to rotate and a pressing shaft which are facing each other;

moving a needle to a position close to the wound string core, the needle including a hook, provided at an end of the needle, for hitching the string, and a latch which is attached on a base portion of the hook as to be freely oscillated to open and close and which is forming a loop with the hook when closed, the needle provided to the holding shaft as to be freely moved back and forth;

rotating the holding shaft and the pressing shaft to wind the string on the wound string core and the needle so that an additional winding portion is formed;

shifting a wound end portion of the string to the hook side by a path changing lever so that the end portion is hitched by the hook, and moving back the needle to pull the end portion, caught by the hook, to come under the additional winding portion;

cutting the string to form an end;

moving the needle forward to pass above the additional winding portion, and moving the needle back to be apart from the end portion; and moving the holding shaft and the pressing shaft to be apart from each other and taking out the wound string core of which end of the string is treated to be fastened.

9. A golf ball manufacturing method for obtaining a wound string core by winding a string, made of rubber, on a core, the method comprising the steps of:

shifting a start treatment means and an end treatment means intermittently in a circumferential direction in an inner area around which a plurality of string winding means are provided in a circle at regular intervals, the start treatment means for winding starting end of the string on the core and transferring the core to each string winding means, the end treatment means for fastening wound string end of the wound string core is obtained by winding the string on the core by each string winding means, the start treatment means and the end treatment means, respectively operating the treatment of the string starting end and the treatment of wound string end in respect of each of the string winding means sequentially, each of the string winding means provided to be contiguous to each other.

10. A golf ball manufacturing method as set forth in claim 9, wherein a sensor senses suspending of supply of a string resulting from running out of or snapping off the string, and string winding rollers of the string winding means stops as receiving a signal from the sensor, whereby the fastening of string end of the wound string core, which is suspended to be wound, is not operated and the start treatment means winds a starting end of the string on the wound string core to operate the treatment of the string starting end, whereby the string is started winding on the core again by the string winding means.

* * * * *